(12) United States Patent
Sebire et al.

(10) Patent No.: US 9,019,829 B2
(45) Date of Patent: Apr. 28, 2015

(54) SCHEDULING DATA TRANSMISSIONS IN A WIRELESS COMMUNICATIONS NETWORK

(75) Inventors: Benoist Sebire, Beijing (CN); Tero Henttonen, Espoo (FI)

(73) Assignee: Sisvel International S.A., Luxembourg (LU)

( * ) Notice: Subject to any disclaimer, the term of this patent is extended or adjusted under 35 U.S.C. 154(b) by 1549 days.

(21) Appl. No.: 11/227,923

(22) Filed: Sep. 16, 2005

(65) Prior Publication Data

US 2006/0062146 A1 Mar. 23, 2006

(30) Foreign Application Priority Data

Sep. 16, 2004 (GB) .................................. 0420658.7

(51) Int. Cl.
*H04L 1/00* (2006.01)
*H04W 72/12* (2009.01)
*H04W 28/22* (2009.01)
*H04W 76/02* (2009.01)
*H04W 88/08* (2009.01)

(52) U.S. Cl.
CPC .......... *H04W 72/1284* (2013.01); *H04W 28/22* (2013.01); *H04W 72/1289* (2013.01); *H04W 76/02* (2013.01); *H04W 88/08* (2013.01)

(58) Field of Classification Search
CPC ... H04W 52/26; H04W 52/267; H04W 28/22; H04L 1/0002; H04L 47/263
USPC .................... 370/335, 322, 229, 468, 395.21, 370/395.43; 455/509, 452, 69; 375/220
See application file for complete search history.

(56) References Cited

U.S. PATENT DOCUMENTS

| 5,912,921 | A | * | 6/1999 | Warren et al. ................. 375/220 |
| 6,473,399 | B1 | * | 10/2002 | Johansson et al. ............ 370/229 |
| 6,477,167 | B1 | * | 11/2002 | Wu .......................... 370/395.21 |
| 6,842,437 | B1 | * | 1/2005 | Heath .......................... 370/322 |
| 7,251,226 | B2 | | 7/2007 | Lindsay et al. |
| 2002/0137519 | A1 | * | 9/2002 | Miyoshi et al. ............... 455/452 |
| 2003/0078065 | A1 | | 4/2003 | Hoagland et al. |

(Continued)

FOREIGN PATENT DOCUMENTS

| CN | 1296712 A | 5/2001 |
| EP | 1 180 907 A2 | 2/2002 |

(Continued)

OTHER PUBLICATIONS

Japanese Office Action dated Oct. 9, 2009.

(Continued)

*Primary Examiner* — Patrick Edouard
*Assistant Examiner* — Michael Irace
(74) *Attorney, Agent, or Firm* — Squire Patton Boggs (US) LLP

(57) ABSTRACT

A method of scheduling transmission of data in a wireless communication network comprising: establishing a data channel for transmitting user data from a user equipment to a network entity, establishing a signaling channel for transmitting signaling data from a user equipment to a network entity, transmitting over said signaling channel from the user equipment a first rate request message requesting additional resources from the network for transmission of data at an increased data rate over said data channel, maintaining said signaling channel for a period awaiting a rate grant message, and transmitting a second rate request message over said signaling channel during said period.

14 Claims, 4 Drawing Sheets

(56) References Cited

U.S. PATENT DOCUMENTS

| | | | |
|---|---|---|---|
| 2003/0232624 A1* | 12/2003 | Toskala et al. | 455/509 |
| 2004/0146016 A1* | 7/2004 | Kim et al. | 370/328 |
| 2004/0223474 A1* | 11/2004 | Kwon et al. | 370/335 |

FOREIGN PATENT DOCUMENTS

| | | |
|---|---|---|
| WO | 00/35219 A1 | 6/2000 |
| WO | WO 00 54438 A1 | 9/2000 |
| WO | WO 03 036848 A1 | 5/2003 |
| WO | WO 03 107694 A1 | 12/2003 |
| WO | WO 2004 068808 A1 | 8/2004 |

OTHER PUBLICATIONS

Chinese Office Action issued Jan. 14, 2011 for corresponding Chinese Application No. 200580036508.6.

U.S. Office Action, dated Sep. 13, 2012; Issued on corresponding U.S. Appl. No. 13/426,125.

Office Action dated Nov. 27, 2014, issued in corresponding CN Patent Application No. 200580036508.6 (with English translation).

\* cited by examiner

SCHEDULING DATA TRANSMISSIONS IN A WIRELESS COMMUNICATIONS NETWORK

The present invention relates to scheduling data transmissions in a wireless communications network.

As is well known, wireless communication networks provide links for real time services such as voice calls (circuit switched) and also for data traffic, generally transmitted in the form of packets and not requiring real time transmission. Network resources which are offered to packet data services are the ones which are not used by circuit switched applications for speech, video, etc.

Existing wireless communication networks for wideband code division multiplexed access (WCDMA) communications operate using a plurality of node Bs which are in wireless communication with user equipment in the form of mobile terminals which can be mobile phones, or any other kind of mobile communicator. Communication between the user equipment and the node Bs is over a wireless interface. Operation of the node Bs is controlled by a radio network controller RNC, each RNC in the network being responsible for a plurality of node Bs. The radio network controller is in communication with a core network CN which, for the purposes of the present discussion is a packet switched network providing packet data from an internet protocol (IP) source, for example, to the radio network controller for dispatch to the user equipment. Conversely, the user equipment can convey packet data to an IP receiver over the wireless channel in communication with the node B, via the radio network controller and the packet switched network. According to Release 5 of the 3GPP standard which governs the behaviour of wireless communications networks, a packet scheduler is located in the radio network controller. The function of the packet scheduler is to schedule transmission of packet data from a number of users in a network. User equipment (UE) with packet data to transmit reports to the packet scheduler in the radio network controller which schedules transmissions based on UE traffic measurement reports. Typically, data is transmitted from one user at full power and as soon as that user has transmitted its packets, the uplink power resource can be made available immediately to another user. By sharing the uplink power resource in this way, it is possible to avoid the peaked variability of noise rise when high data rates are allocated to users running bursty high data-rate applications. It will be appreciated that the user equipment cannot all simultaneously transmit data at full power because of interference problems.

The radio network controller issues a list of permitted traffic format combinations (TFCs) to user equipment that are granted resources. A transport format represents the configuration of a transport channel, for example the number of input bits, channel coding, interleaving, etc for use in transmitting the data. A transport format is used for one transport channel. Each transport channel has a certain set of allowed transport formats, and this set is called TFS. A TFC is a combination of one allowed TF for each transport channel, and a TFCS lists all the allowed Transport Format Combinations. Thus, each transport channel has a set of possible transport formats, and only a limited number of combinations of transport formats for each channel is allowed. A valid combination of transport formats for a set of transport channels is termed a transport format combination (TFC). The transport format combination effectively determines the rate at which data is transmitted.

In the current architecture, the packet scheduler is located in the radio network controller and is therefore limited in its ability to adapt to instantaneous traffic changes because of bandwidth constraints on the signalling interface between the radio network controller and the user equipment. Hence, to accommodate the variability in traffic, the packet scheduler must be conservative in allocating uplink power for data transmissions from the user equipment to take into account the influence from inactive users in the following schedule period. This is a solution which turns out to be spectrally inefficient for high allocated data rates and long release timer values.

In Release 6 of the 3GPP standard, the uplink data channel has been enhanced and is hereinafter referred to as EDCH. With EDCH, much of the packet scheduler functionality is transferred to the node B. That is, node B includes a scheduler that takes care of allocating uplink resources. The node B makes decisions based on information received from the radio network controller and interference measurement at the node B itself. Instead of the radio network controller transmitting the list of TFCs to the UE, the node B transmits the list. For transmission of data, the UE selects a transport format combination which suits the amount of data to be transmitted in its RLC buffer. This determination is subject to constraints on the maximum transmission power of the UE and the maximum allowed TFC, that is the TFC with the maximum data rate permitted by the node B in the present circumstances of the network. If needed, the user equipment can request a higher bit rate by sending rate request messages in its uplink channel. The node B then decides whether or not to grant the additional resources by responding with a rate grant message in the downlink channel.

The packet scheduling decision is typically performed every packet scheduling period at the node B. A packet scheduling period is typically much longer than a transmission frame. At the UE, selection of a particular transport format combination is performed at each transmission time interval (TTI). The UE has a dedicated MAC function, called TFC selection, which determines the used TFC for each TTI. The TFC selection can operate at every boundary of the shortest TTI.

A problem arises because of the round trip delay between the UE dispatching a rate request message and receiving an answer from the node B. During that time, the signalling bandwidth between the user equipment and the node B is wasted on the uplink. Furthermore, if the rate request message is lost, it takes another whole cycle for the requests to be signalled and eventually granted.

FIG. 1 illustrate a typical rate request/rate grant cycle when the UE is requesting additional resources with the rate request message sent on the uplink channel and the node B granting some additional resources with the rate grant sent on the downlink channel.

FIG. 1 shows the time transmission intervals numbered 0 to 8 and the operational cycle of the user equipment UE and node B. At the UE, the operational cycles include identification that the UE needs more resources (TTI 0), a coding of the rate request increase (TTI 1) and transmission of the rate request increase (TTI 2).

At node B, the rate request message is received at TTI 2 and decoded in TTI 3. In TTI 4, the node B agrees to allocate more resources, at TTI 5 the rate grant increase is coded and at TTI 6 the rate grant increase is sent. At TTI 6 the rate grant increase is received at the UE, decoded in TTI 7 and at TTI 8 the UE is now aware that it has been allocated more resources and can make a different decision to select a TFC with an increased bit rate from its TFC list.

In this example, the RR/RG cycle is eight transmission time intervals. Although in practice a cycle will depend on implementation factors, and as a result may be a bit shorter or a bit longer, it is believed that this example depicts well what happens in the average case.

It is an aim of this invention to overcome or at least ameliorate the above-mentioned problem.

According to one aspect of the invention there is provided a method of scheduling transmission of data in a wireless communication network comprising: establishing a data channel for transmitting user data from a user equipment to a network entity; establishing a signalling channel for transmitting signalling data from a user equipment to a network entity; transmitting over said signalling channel from the user equipment a first rate request message requesting additional resources from the network for transmission of data at an increased data rate over said data channel; maintaining said signalling channel for a period awaiting a rate grant message; and transmitting a second rate request message over said signalling channel during said period.

Thus, in the described embodiment, in order to use some of the uplink signalling bandwidth that would otherwise be wasted while waiting for an answer in the form of a rate grant message, and in order to reduce the risk of losing a rate request message, the rate requests are repeated on the signalling channel. In the described embodiment, the rate grant messages are transmitted from a network entity in the form of a node B. It will readily be appreciated however that the invention can be implemented in any wireless communications systems architecture.

Another aspect of the invention provides a user equipment for use in a wireless communications network comprising: means for establishing a data channel for transmitting user data; means for establishing a signalling channel for transmitting signalling data from a user equipment to a network entity; means for transmitting over said signalling channel a first rate request message requesting additional resources from the network for transmission of data at an increased data rate; means for maintaining said signalling channel for a period awaiting a rate grant message; and means for transmitting a second rate request message over said signalling channel during said period.

A further aspect of the invention provides a wireless communications system comprising at least first and second network nodes in wireless communication, the first network node comprising: means for establishing a signalling channel for transmitting signalling data between the first and second network nodes; means for transmitting over said signalling channel a first rate request message to the second network node requesting additional resources from the network for transmission of data at an increased data rate; means for maintaining said signalling channel for a period awaiting a rate grant message from the second network node; and means for transmitting a second rate request message to the second network node over said signalling channel during said period.

A further aspect of the invention provides a network entity for use in a wireless communications network which comprises a packet scheduler operable to receive a first rate request message from a user equipment in the network and to determine within a predetermined time period whether a rate grant message is to be issued or not based on network resources, and to issue said rate grant message in the event that there are adequate network resources, the packet scheduler being arranged to ignore subsequent rate request messages received during said predetermined time period.

One possibility for transmitting the rate request message is to send it on the enhanced data communication channel (E-DPCCH) together with other uplink signalling information such as transport format (TF) information and HARQ information. This could be done by reserving one bit for the rate request message, where RR=1 means UP (increased data rate), and RR=0 means KEEP (do not increase).

For a better understanding of the present invention and to show how the same may be carried into effect, reference will now be made by way of example to the accompanying drawings, in which.

Figure 1:
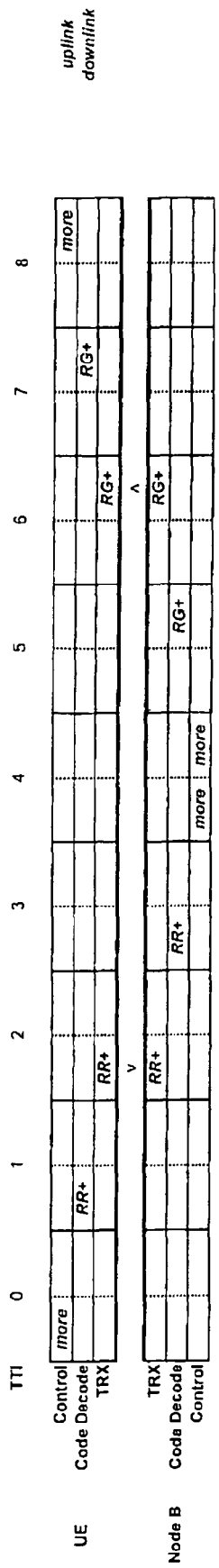
FIG. 1 is a timing diagram illustrating existing scheduling timing.
Figure 2:
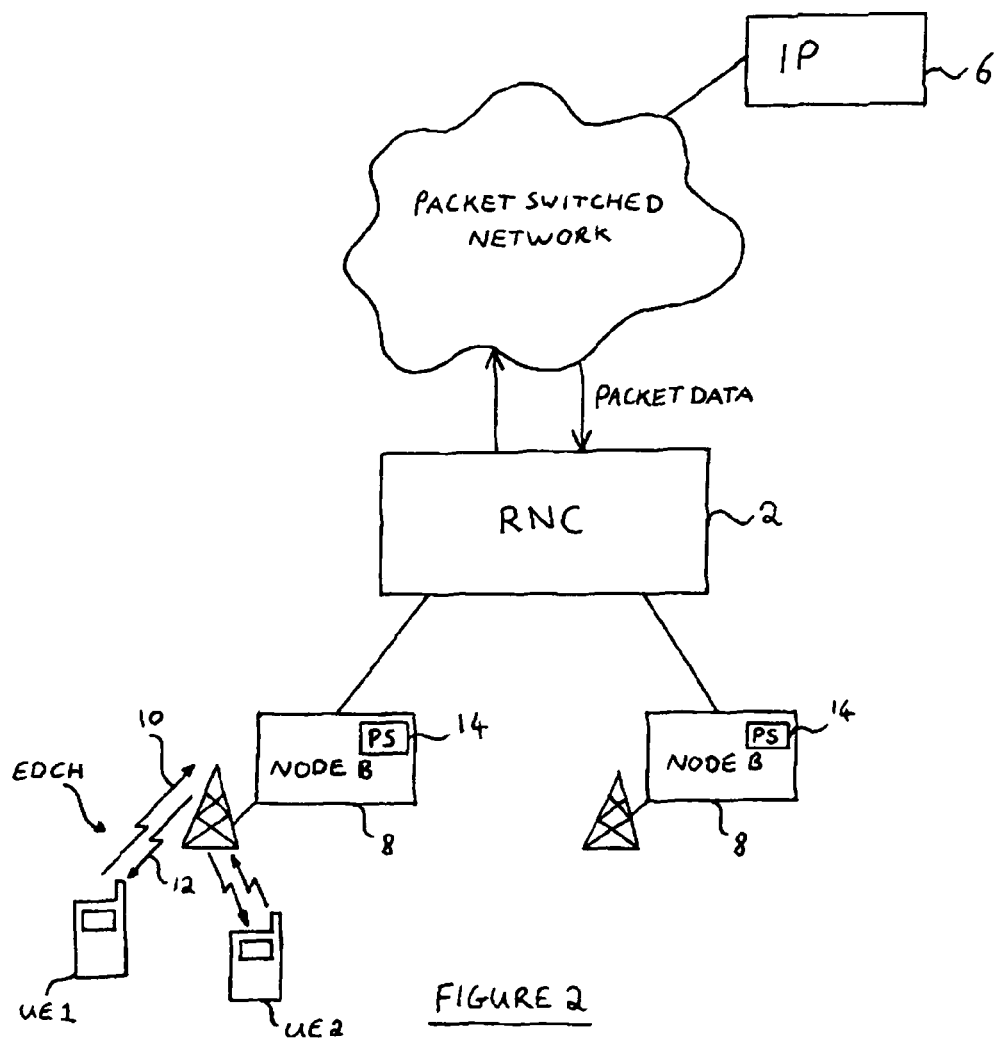
FIG. 2 is a schematic block diagram of a wireless communications network.

FIG. 2 illustrates in schematic form elements of a wireless communications network needed to understand the present invention. A radio network controller RNC 2 is in communication with a packet switched core network CN 4 for receiving and transmitting packet data from an IP source 6. The radio network controller controls a plurality of node Bs 8, two of which are shown in FIG. 2.

Each node B manages a cell or sector of the network in which is located a plurality of user equipment, two of which UE 1, UE 2 are shown in FIG. 2. Each user equipment is in connection with its node B over a wireless interface comprising an uplink channel 10 and a downlink channel 12 in each case. The uplink channel 10 includes in this particular case an enhanced data channel, corresponding to an enhancement of the uplink DCH for data packet traffic in Release 6 of 3GPP, in particular TR25.896 Feasibility Study for Enhanced Uplink for UTRAFDD and TR25.808 FDD Enhanced Uplink-Physical Layer Aspects.

Each node B includes a packet scheduler PS 14 which schedules the transmission of packet data from the user equipment UE based on sharing of uplink power resource in a manner which is known per se but has been described in the introductory part. In this respect reference is also made to R1-030791, "Node B Controlled Rate Scheduling by Fast UE Transmission Power Limitation", which is incorporated herein by reference.

According to that paper, in order to differentiate the user equipments, each user equipment using E-DCH (Enhanced DCH) is assigned to a group defined by some characteristics. An example of a grouping strategy could be to differentiate UEs based on some billing policy, where business users would be separated from normal users. Another example could be the quality of service (QoS) required by the service to be transmitted or, if dynamic association is supported, this grouping could also be done depending on the UE position. The UE grouping procedure could be built on the already standardised RACH access procedure where access service classes (ASCs) are defined in order to prioritise initial access for some user equipments (specified in R99).

When the cell load is much lower than the maximum noise limit, nothing is changed with respect to current specifications. No new UL/DL scheduling signalling is needed and the physical resources are not wasted without use. As the noise raise approaches the noise raise maximum threshold (e.g. 6 db), a scheduling process is triggered at a node B which sets, for each UE group (GPI), temporary limitations $P_{lim\_GPi}$ on the maximum UE transmission power for all UEs belonging to the same group GPi. Each UE compares the power limitation of its UE group with respect to its own maximum allowed transmission power, which is configured by the network and takes the minimum of both values of the maximum power that shall not be exceeded over a predefined period (e.g 1 TTI).

Depending on the scheduling strategy, the node B might permit UEs with high priority (e.g. business user) to fully access the resources while low priority users (e.g. background services) will have to limit their transmission power. If the given limitation is not sufficient, the node B is able to set the power limitation lower or/and start limiting UEs of a different group.

Figure 3:
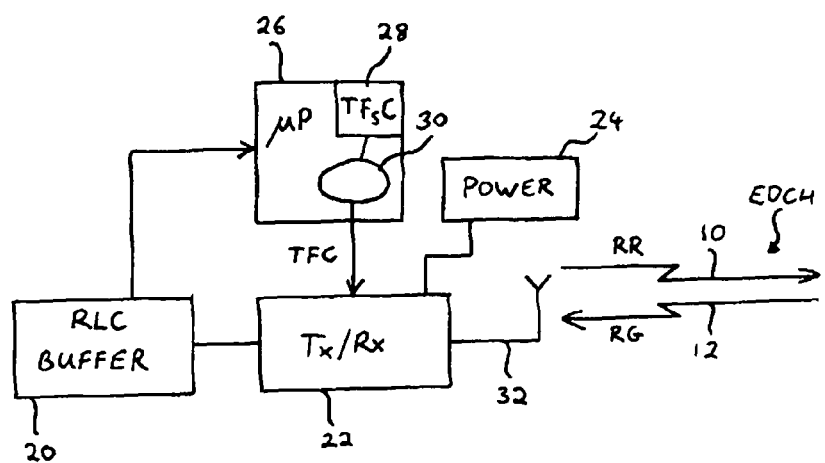
FIG. 3 is a schematic block diagram of circuitry at a user equipment.

FIG. 3 illustrates a schematic block diagram of circuitry at a user equipment, for example UE 1. It includes an RLC buffer 20 for holding packets to be transmitted. A transmit/receive block 22 is in communication with the RLC buffer and also with a power supply 24 which provides power for transmission in line with information received from node B concerning the uplink power available for transmission. A microprocessor 26 governs operations of the user equipment UE, and in particular in this respect receives and stores a list of transport format combinations (TFCs) 28 and executes a TFC selection function 30 which will be described in more detail hereinafter. The user equipment UE also includes an antenna 32 for transmitting and receiving data and control signals over the wireless interface. In FIG. 3, RR denotes rate request messages transmitted on the uplink channel 10 and RG denotes rate grant messages transmitted on the downlink channel 12. A rate request demands a different data rate, usually greater, for data transmission, and a rate grant message indicates its availability. The nature of the RG message depends on the DL signalling mechanism. If the signalling is always there, up, keep or down is always transmitted. A negative response is then=keep. If the signalling is not always there, a negative response=no response.

In operation the user equipment UE 1 reports the quantity of packet data in the RLC buffer 20 to the packet scheduler 14 in the node B 8. Note that the node B 8 will also be receiving similar reports from other user equipment. The node B 8 makes a scheduling decision based on UE traffic measurement reports also received from the user equipments which it is controlling. The node B transmits over the downlink channel 12 to user equipments which have been granted resources information to control the maximum allowed TFC in the list of transport format combinations represented by the TFC list 28. The RNC is initially responsible for determining the TFCS, which is then relayed to node B. After this, the RNC may add/delete a TFC to/from TFCS or even completely redefine the whole TFCS. Node B controls the maximum allowed TFC in the TFCS for a given UE. So the list is prestored in the UE with respect to node B scheduling, but the prestored list may also be modified by the RNC. Another option is for the node B to send a list of TFCs that are allowed.

As explained above, amongst other things each transport format combination implies a certain bit rate for data transmission measured in kilobits per second. The microprocessor 26 is arranged to control transmission of packet data from the buffer 20 via the transmit/receive circuit 22 in respect of transmission time intervals. A TFC selection is performed at each transmission time interval TTI by the TFC selection function 30 and based on the TFCs available in the list 28. This is subject to maximum power and maximum TFC constraints which have been received from the node B on the downlink 12. When the UE wishes to transmit using a higher data rate, the microprocessor 26 is arranged to cause the transmit/receive unit 22 to dispatch a rate request message RR on the uplink 10. However, distinct from the known case discussed above, the user equipment UE does not wait for the receipt of a request grant RG message (or the absence of a rate grant message at the end of the appropriate period), but instead repeats the rate request message on the uplink 10. In this way, some of the uplink signalling bandwidth which would otherwise be wasted is utilised in the dispatch of multiple rate request messages to reduce the risk of losing a rate request message. Two different embodiments are disclosed herein. According to a first embodiment, the user equipment repeats the rate request a fixed number of times on the uplink channel 10. This can be done in consecutive TTIs or in some predefined pattern, for example every other TTI.

According to the second embodiment, the user equipment continues to dispatch rate request messages (again consecutively or in some predefined pattern) for as long as a rate grant message has not been received on the downlink 12.

Figure 4:
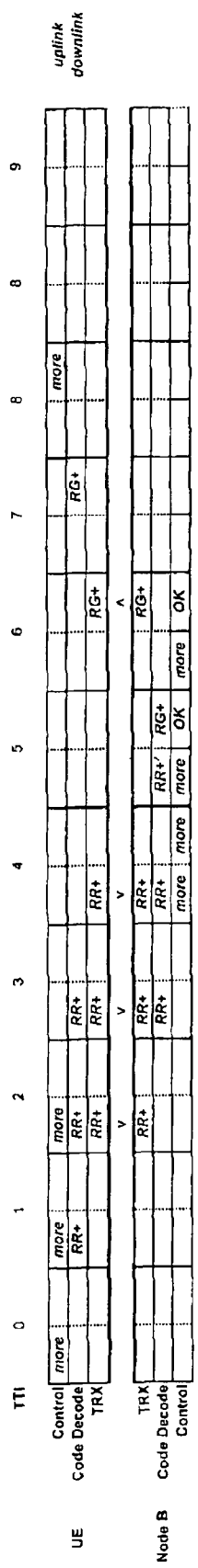
FIG. 4 is a timing diagram illustrating one embodiment of the present invention.

FIG. 4 depicts the case where rate requests are consecutively repeated a fixed number of times in the uplink, three times in the described example TTI 2, TTI 3 and TTI 4 in FIG. 4. The node B knows to expect repetition, so that it can safely ignore rate requests received after the first one. In FIG. 4, the rate request messages are repeated in consecutive TTIs. However, in the case where they are transmitted in non-consecutive TTIs, the principle is the same. The node B grants additional resources or not to the user equipment upon receiving the first rate request message. Note that it is also possible that the node B grants additional resources at some other point in time depending on the cell load. For instance, additional resources can be allocated only when receiving the third rate request message. [Thus, by coincidence the grant of additional resources which would have been refused at the first rate request message can now be granted at the third rate request message Moreover, if the first and second rate request messages are lost, the third may still get through.

Figure 5:
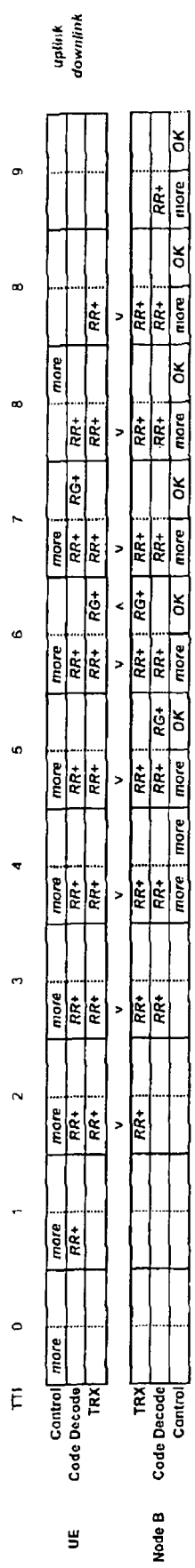
FIG. 5 is a timing diagram illustrating another embodiment of the present invention.

FIG. 5 depicts the case where rate request messages are issued as long as a rate grant message has not been received on the downlink 12. As the node B knows that there will be repetition, it can safely ignore the rate request received after the first one. In this example, the node B grants additional resources to the UE upon receiving the first rate request message. It is also possible that the node B grants additional resources at some other point in time depending on the cell load. For instance, additional resources can be allocated only when receiving the third rate request message, as explained above.

Additionally, if it is possible for the user equipment and node B to assess the rate request/rate grant cycle, advanced error case management is possible. For example, if it is assumed that a user equipment only ever sends a rate request message meaning a rate increase (RR=up), if a node B decodes any other rate request from a UE it will treat this as an error and ignore it. This helps in cases where some rate request messages get dropped and some get received, since the incorrect rate request will just get ignored.

If the user equipment has asked for more resources and the node B has sent a rate grant but the user equipment has not started using the additional resources when it should have, the node B can either send another rate grant or wait for the user equipment to ask for more resources again.

If the user equipment has asked for more resources but no rate grant from the node B has been received, thanks to the repetition it is safe to assume that the request was received but the node B did not have additional resources to allocate to the user equipment. In that case, the user equipment can either wait for some time before asking for some more resources or wait for rate grants since the node B should be aware anyway.

If a rate grant is send by the node B and within a few TTIs a rate request is received, the node B should ignore the rate request if it thinks it was received by the UE before receiving the rate grant.

A clear advantage of the embodiments of the invention discussed above is the proof of reliability for rate request messages, which translates directly into faster scheduling of higher data rates than in the case where a one shot rate request message is sent.

In the above description, reference is to rate scheduling, but it will be appreciated that time/rate scheduling can also be used. With time/rate scheduling, the node B really sends a complete list of TFCs that the UE must use during the time it is allowed to transmit, while with rate scheduling the node B just sends the maximum RFC that the UE is allowed to use and the UE then makes the actual selection by itself.

The invention clamed is:

1. A method, comprising:
   transmitting over a signalling channel from a user equipment a first rate request message requesting additional resources from the network for transmission of data at an increased data rate over a data channel;
   maintaining said signalling channel for a period; and
   transmitting a second rate request message over said signalling channel during said period, wherein the second rate message is a repeat of the first rate request message;
   wherein the first rate request message is a single reserved bit sent together with other uplink signaling information, the single reserved bit having a value selected from a first value indicating that the increased data rate is required and a second value indicating that a current rate of data transmission over the data channel is sufficient.

2. A method according to claim 1, wherein the first and second rate request messages are transmitted in respective transmission time intervals.

3. A method according to claim 1, wherein a plurality of second rate request messages are transmitted during said period.

4. A method according to claim 3, wherein there is a fixed number of second rate request messages in said plurality of second rate request messages which are transmitted during said period.

5. A method according to claim 3, wherein said plurality of second rate request messages are transmitted during said period until a rate grant message is received.

6. A method according to claim 2, wherein a plurality of second rate request messages are transmitted in consecutive transmission time intervals.

7. A method according to claim 2, wherein a plurality of second rate request messages are transmitted in a predefined pattern of transmission time intervals.

8. A method according to claim 1, further comprising: receiving a rate grant message at the user equipment and transmitting data at said increased data rate.

9. A method according to claim 1, further comprising:
   detecting that no rate grant message has been received at the end of said period and transmitting data at the current rate.

10. A method according to claim 1, wherein the increased data rate exceeds the current data rate at which data was previously being transmitted.

11. A method according to claim 1, further comprising: detecting that no rate grant message has been received at the end of said period, and transmitting a new rate request message after an additional predetermined time period.

12. A method according to claim 1, further comprising: detecting that no rate grant message has been received at the end of said period and waiting an additional time period to receive a rate grant message.

13. An apparatus, comprising:
   means for transmitting over a signalling channel a first rate request message to request additional resources from a network entity for transmission of data at an increased data rate over a data channel;
   means for maintaining said signalling channel for a period; and
   means for transmitting a second rate request message over said signalling channel during said period, wherein the second rate request message is a repeat of the first rate request message,
   wherein the first rate message is a single reserved bit sent together with other uplink signaling information, and the single reserved bit has a value selected from a first value indicating that the increased data rate is required and a second value indicating that a current rate of data transmission over the data channel is sufficient.

14. A computer program embodied on a non-transitory computer readable medium, said computer program configured to control a processor to perform:
   transmitting over a signalling channel from a user equipment a first rate request message requesting additional resources from the network for transmission of data at an increased data rate over a data channel;
   maintaining said signalling channel for a period; and
   transmitting a second rate request message over said signalling channel during said period, wherein the second rate message is a repeat of the first rate request message;
   wherein the first rate request message is a single reserved bit sent together with other uplink signaling information, the single reserved bit having a value selected from a first value indicating that the increased data rate is required and a second value indicating that a current rate of data transmission over the data channel is sufficient.

* * * * *